United States Patent [19]
Cho

[11] Patent Number: 5,184,219
[45] Date of Patent: Feb. 2, 1993

[54] METHOD FOR TRANSMITTING SPECTRUM-COMPATIBLE HIGH-DEFINITION TELEVISION SIGNAL AND CIRCUIT THEREFOR IN A TELEVISION SIGNAL TRANSMISSION SYSTEM

[75] Inventor: Hyun-Deok Cho, Suwon, Rep. of Korea

[73] Assignee: Samsung Electronics Co., Ltd., Suwon, Rep. of Korea

[21] Appl. No.: 691,856

[22] Filed: Apr. 26, 1991

[30] Foreign Application Priority Data

May 12, 1990 [KR] Rep. of Korea ............... 1990-6789

[51] Int. Cl.$^5$ ..................... H04N 7/04; H04N 11/06
[52] U.S. Cl. .................................. 358/141; 358/12
[58] Field of Search ............ 358/141, 105, 167, 31, 358/36, 166, 142, 140, 11, 12, 23

[56] References Cited

U.S. PATENT DOCUMENTS

| | | | |
|---|---|---|---|
| 4,658,285 | 4/1987 | Lewis, Jr. ................... | 358/31 X |
| 5,014,116 | 5/1991 | Kawai ......................... | 358/141 |
| 5,043,807 | 8/1991 | Rabii .......................... | 358/36 X |

*Primary Examiner*—Victor R. Kostak
*Attorney, Agent, or Firm*—Robert E. Bushnell

[57] ABSTRACT

An HDTV system wherein the HDTV signals may have the same frequency band as that of the conventional color television signals and be transmitted through a unoccupied channel of the conventional color television system, is disclosed. The HDTV system includes a ITLC circuit for compressing on time-base the digital signals; a band separation circuit for separating the output signal of the ITLC circuit into low and high frequency band signal; a motion vector detector for detecting motion vector from the low frequency band signals; a high frequency band signal processor for processing the high frequency band signals according to the output of motion vector detector; a first LPF for filtering the high frequency analog signal; a second LPF for filtering the low frequency analog signal; and a quadrature modulator for multiplying the output of the first and second LPF, respectively, by Cos ωt signal and Sin ωt signal, and thereafter adding the multiplied signals to each other to produce therefrom a transmission signal.

44 Claims, 8 Drawing Sheets

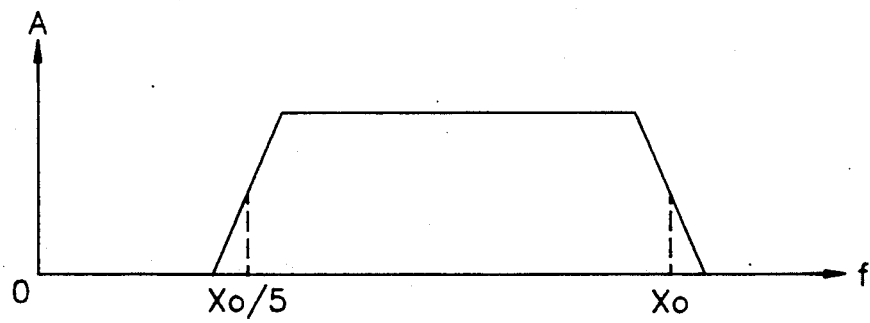
FIG. 6A
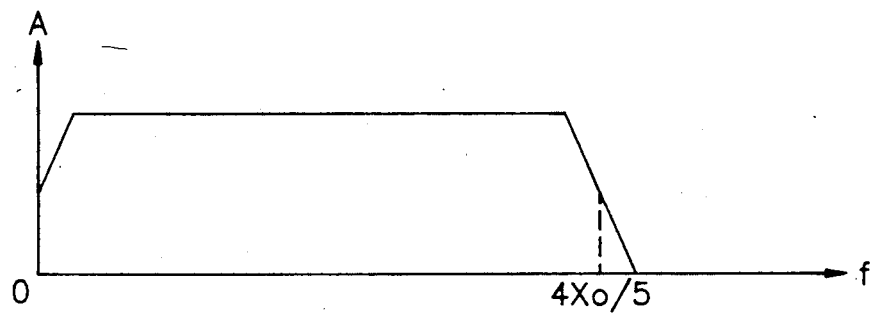
FIG. 6B
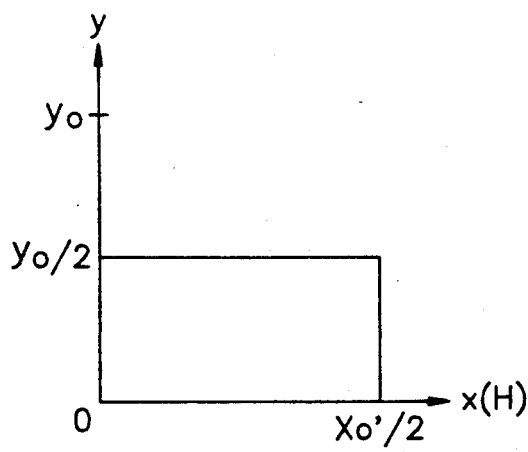 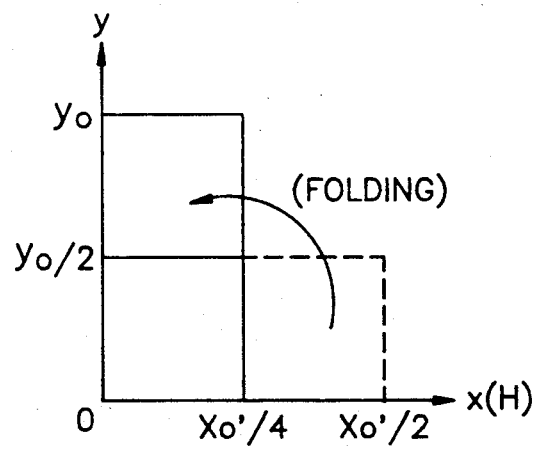
FIG. 11A        FIG. 11B

METHOD FOR TRANSMITTING SPECTRUM-COMPATIBLE HIGH-DEFINITION TELEVISION SIGNAL AND CIRCUIT THEREFOR IN A TELEVISION SIGNAL TRANSMISSION SYSTEM

BACKGROUND OF THE INVENTION

The present invention relates to a method and a circuit for transmitting spectrum-compatible high-definition television signal in a television signals transmission system, wherein frequency band separation technique and sub-sampling technique are employed.

Since late 1960 high-definition television (HDTV) system has been developed in Japan. There have been proposed various prototypes of HDTV systems such as Japanese MUSE (multiple sub-Nyquist sub-sampling encode) system, European HD-MAC system, AC-TV of DSRC spectrum- compatible HDTV system of Zenith, MIT system using sub-frequency band coding technique and SLSC of the Bell Lab. developed by the U.S.A. However, one of the problems to solve is to make a HDTV system compatible with a conventional color TV. In this point, the japanese MUSE system is incompatible with a conventional color TV. While the HDTV system of the AC-TV is compatible with a conventional NTSC color TV, the frequency must be extended.

SUMMARY OF THE PRESENT INVENTION

It is an object of the present invention to provide an HDTV system whereby the HDTV signals may have the same frequency band as conventional color TV signals and be transmitted through a unoccupied channel of the conventional color TV system.

It is another object of the present invention to provide an HDTV system compatible with the conventional TV signal transmission system and employ both frequency band separation technique together and sub-sampling technique.

According to the present invention, there is provided a circuit for transmitting spectrum- compatible high-definition TV signals in a TV signal transmission system, comprising an analog-to-digital converter (A/D converter) for converting luminance signal and chrominance signals into digital data; a circuit of integration of time compressed luminance and chrominance signal (ITLC) for compressing on time-base the digital data outputted from the A/D converter; a band separation circuit for separating the output signal of the ITLC circuit into low and high frequency bands; a motion vector detector for detecting motion vector from the low frequency band signals of the band separation circuit; a high band signal processor for processing the high frequency band signals from the band separation circuit according to the motion vector signals of the motion vector detector; a delay circuit for delaying the low frequency band signals from the band separation circuit; a control and synchronizing adder for adding the output of the delay circuit to the motion vector signal of the motion vector detector; an audio encoder for encoding audio signals inputted through audio input terminal; an audio and synchronizing adder for adding the output signals of the audio encoder to the output signals of the high band signal processor; a first digital-to-analog (D/A) converter for converting the output signals of the audio and synchronizing adder; a second D/A converter for converting the output signals of the control and synchronizing adder; a first low-pass filter (LPF) for filtering the output signals of the first D/A converter; a second low-pass filter for filtering the output signals of the second D/A converter; a quadrature modulator for multiplying the output signals of the first and second low-pass filter by $Cos\omega t$ signal and $Sin\omega t$ signal, respectively, and thereafter synthesizing the multiplied signals to each other to produce therefrom a transmission signal; and a transmission processor for processing the transmission signal so as to be adapted to transmission.

BRIEF DESCRIPTION OF THE ATTACHED DRAWINGS

The foregoing and other objects, aspects and advantages of the invention will be better understood from the following detailed description of the preferred embodiments of the invention with reference to the accompanying drawings, in which:

FIG. 6a and 6b show the characteristic diagrams of the signal shifts of the frequency shifter 52 of FIG. 2;

FIGS. 11a and 11b illustrate the characteristics of the H-V low-pass filter 53 of FIG. 2 and spectrum folding;

DETAILED DESCRIPTION OF A PREFERRED EMBODIMENT

Figure 1:
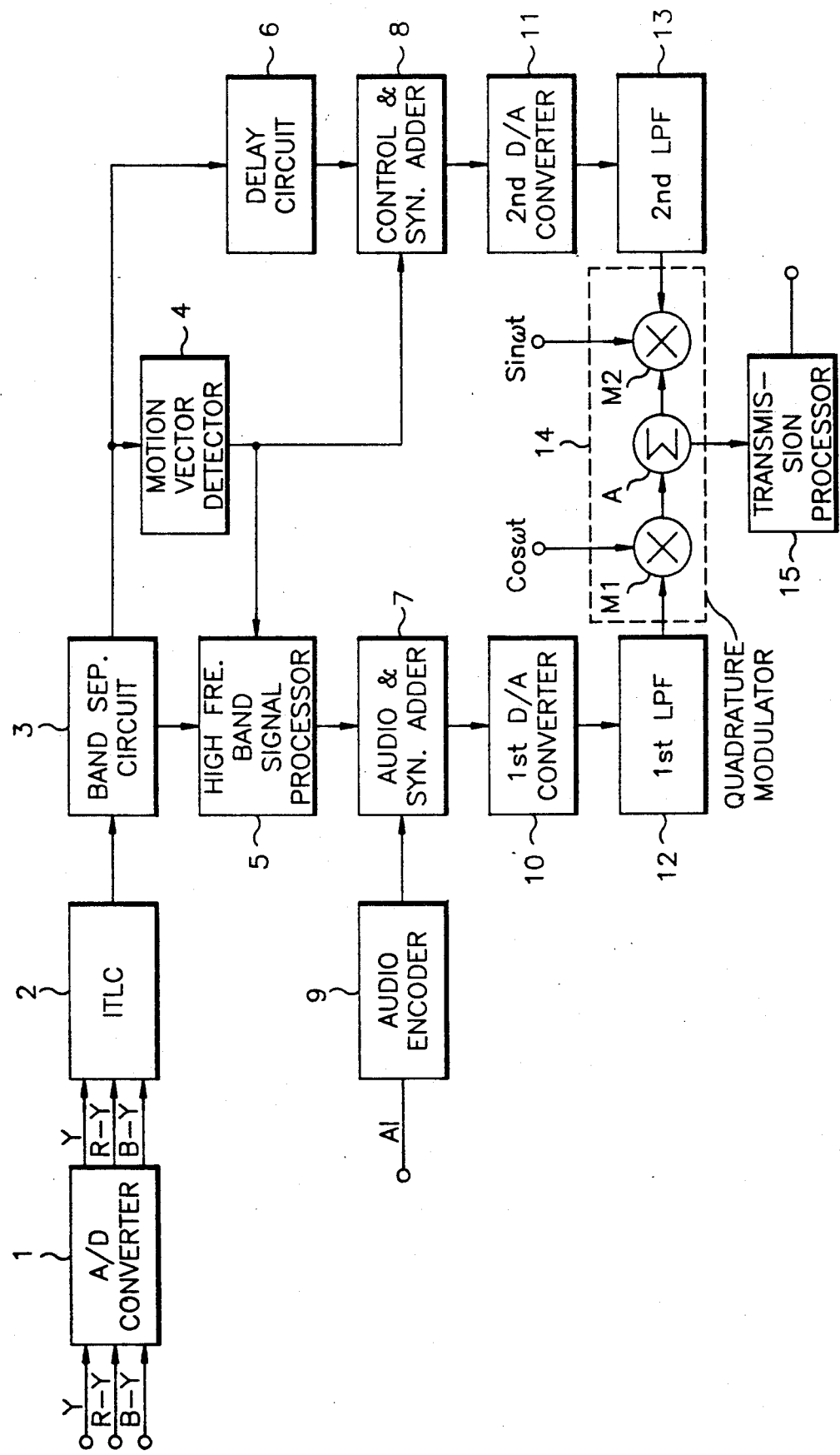
FIG. 1 is a block diagram for illustrating the inventive circuit.

Referring to FIG. 1, an analog-to-digital converter (A/D converter) 1 is to convert luminance signal Y and chrominance signals R-Y, B-Y into digital data. A circuit of integration of time compressed luminance and chrominance signal (ITLC) 2 is to compress on time-base the digital data outputted from the A/D converter 1. A band separation circuit 3 to separate the output signal of the ITLC circuit 2 into low and high frequency bands.

A motion vector detector 4 detects a motion vector from the low frequency band signals of the band separation circuit 3. A high frequency band signal processor 5 processes the high frequency band signals from the band separation circuit 3 according to the motion vector signals of the motion vector detector 4. A delay circuit 6 delays the low frequency band signals from the band separation circuit 3.

A control and synchronizing adder 8 adds the output of the delay circuit 6 to the output of the motion vector signal of the motion vector detector 4. An audio encoder 9 encodes audio signals inputted through audio input terminal (AI). An audio and synchronizing adder 7 adds the output signals of the audio encoder 9 to the output of the high frequency band signal processor 5.

A first D/A converter 10 converts the output signals of the audio and synchronizing adder 7. A second D/A converter 11 converts the output signals of the control and synchronizing adder 8. A first low-pass filter 12 filters the output signals of the first D/A converter 10. A second low-pass filter 13 filters the output signals of the second D/A converter 11.

A quadrature modulator 14 multiplies the output signal of the first and second low-pass filter 12, 13 by $Cos\omega t$ signal and $Sin\omega t$ signal respectively, and thereafter adds the multiplied signals to each other to produce therefrom a transmission signal. A transmission processor 15 processes the output signals of the quadrature modulator 14 so as to be adapted to transmission.

Figure 2:
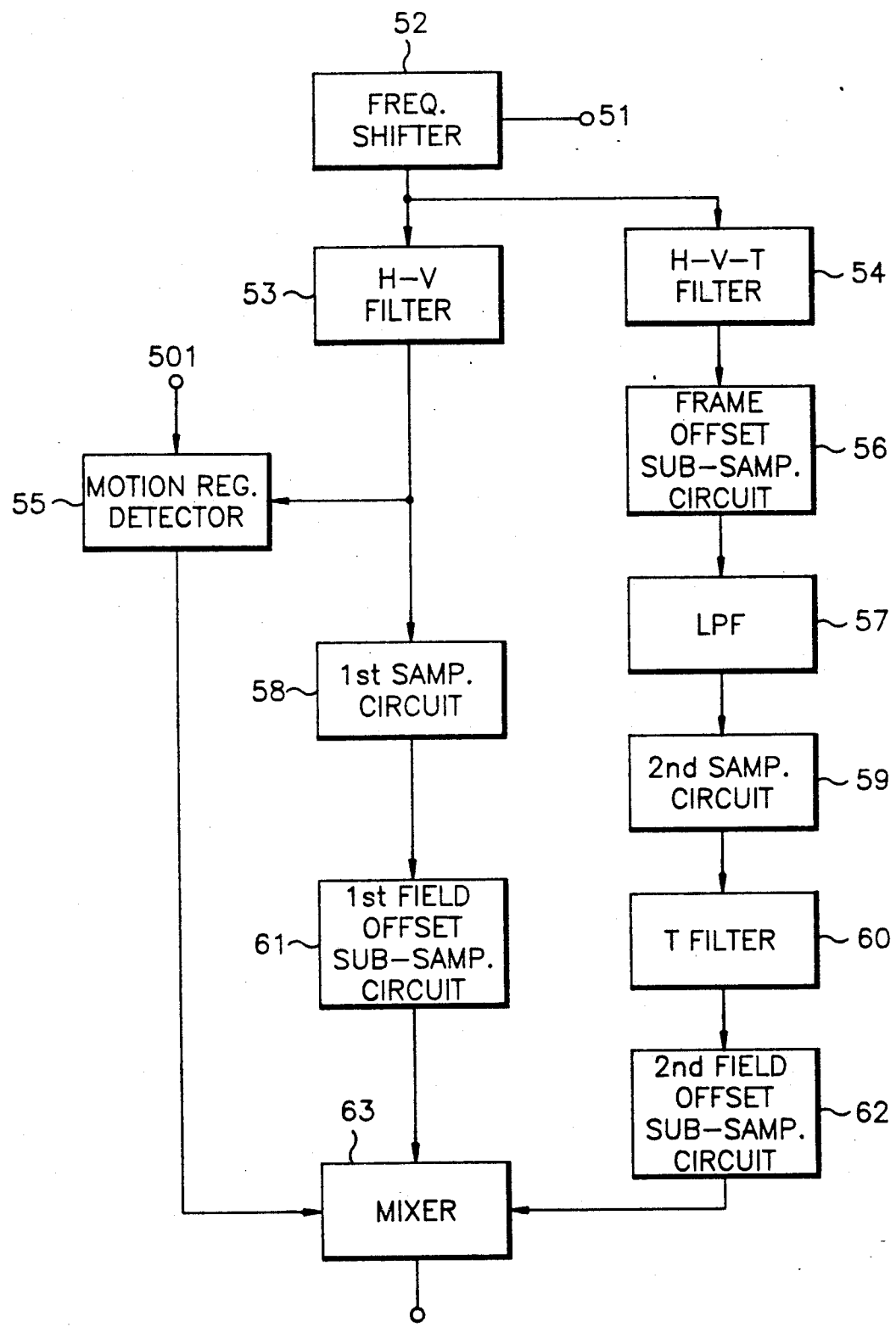
FIG. 2 is a block diagram for illustrating the high frequency band signal processor 5 of FIG. 1.

Referring to FIG. 2, the high frequency band signal processor 5 comprises a frequency shifter 52, an H-V (horizontal-vertical) low-pass filter 53, an H-V-T (horizontal-vertical-time) filter 54, a frame offset sub-sampling circuit 56, a low-pass filter 57, a second sampling circuit 59, a T(time)-filter 60, a second field offset sub-sampling circuit 62, a motion region detector 55, a first sampling circuit 58, a first field offset sub-sampling circuit 61, and a mixer 63.

The frequency shifter 52 shifts the high frequency band signals from the band separation circuit 3. An H-V low-pass filter 53 filters the output signals of the frequency shifter 52 horizontally and vertically.

An H-V-T filter 54 filters the output signal of the frequency shifter 52 in horizontal, vertical and timing direction. A frame offset sub-sampling circuit 56 sub-samples the output signal of the H-V-T filter 54 in frame offset.

A low-pass filter 57 filters the output signals of the frame offset sub-sampling circuit 56 in horizontal direction.

A second sampling circuit 59 samples the output signals of the low-pass filter 57 in proportion of two to one. A T-filter 60 is to filters the output signals of the second sampling circuit 59 in the timing axis. A second field offset sub-sampling circuit 62 sub-samples the output signals of the T-filter 60 in field offset. A motion region detector 55 detects motion region by receiving the output signals of the H-V low-pass filter 53 according to the output signals of the motion vector detector 4.

A first sampling circuit 58 samples the output signals of the H-V low-pass filter 53 in proportion of two to one. A first field offset sub-sampling circuit 61 is to sub-sample the output signals of the first sampling circuit 58 in field offset. A mixer 63 is to mix the output signals of the first offset sub-sampling circuit 61 with the output signals of the second field offset sub-sampling circuit 62, according to the output signals of the motion region detector 55.

Figure 4A:
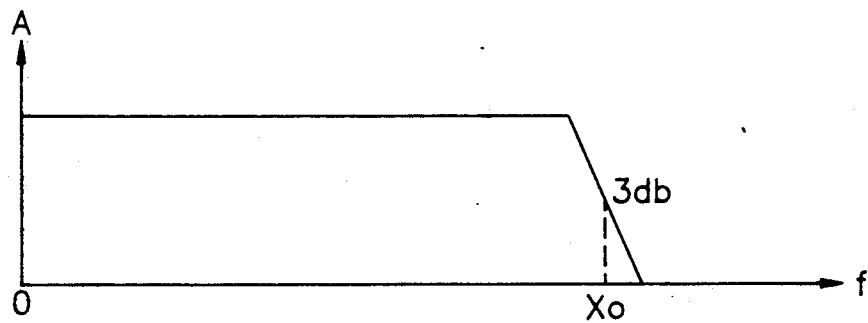
FIGS. 4a-4c are examples of the frequency band separation of the frequency band separation circuit 3 of FIG. 1.
Figure 4B:
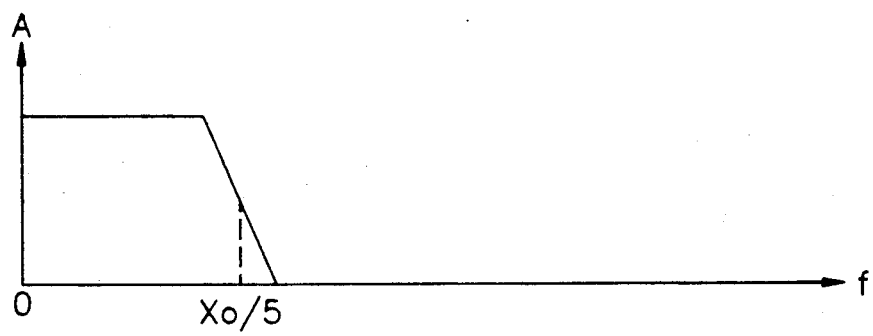
Figure 4C:
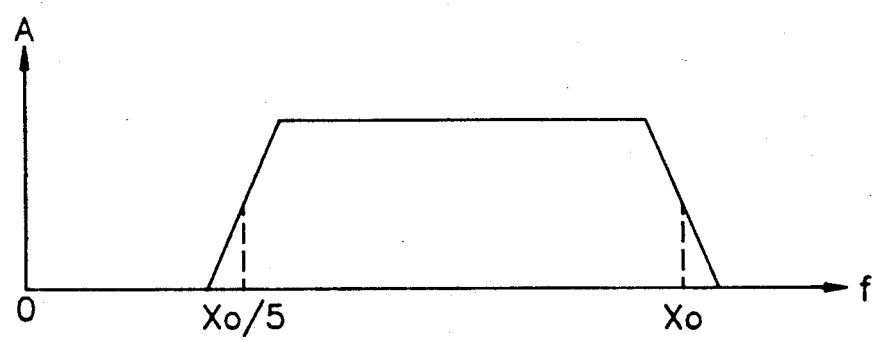

FIG. 4A shows the full band of the output signals of ITLC 2, FIG. 4B the separation into the low frequency band, and FIG. 4C the separation into the high frequency band.

Figures 7A, 7B:
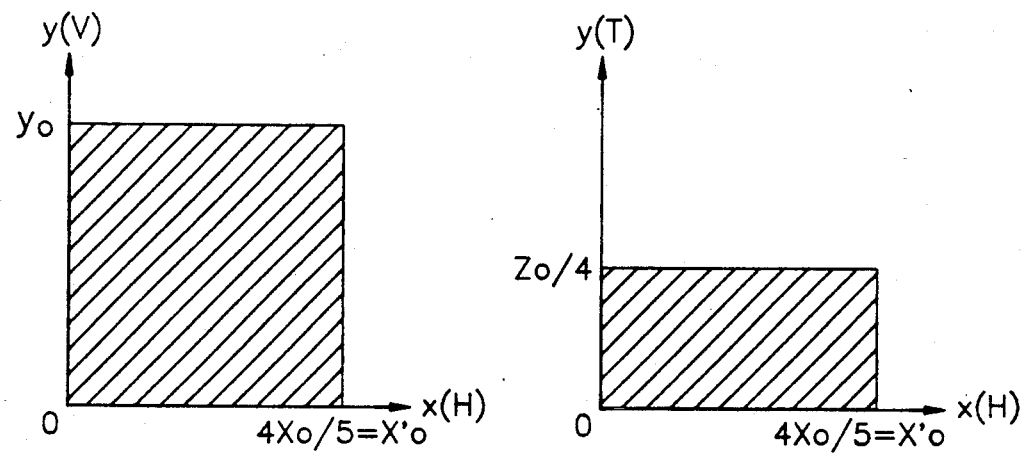
FIGS. 7a and 7b illustrate the output characteristics of the H-V-T filter 54 of FIG. 2.

The characteristics before and after the frequency shift are respectively shown in FIGS. 6A and 6B. The output characteristics of the H-V-T filter 54 of FIG. 2 are shown in FIGS. 7A and 7B respectively representing the filtering in the direction of vertical and timing axes.

Figure 9A:
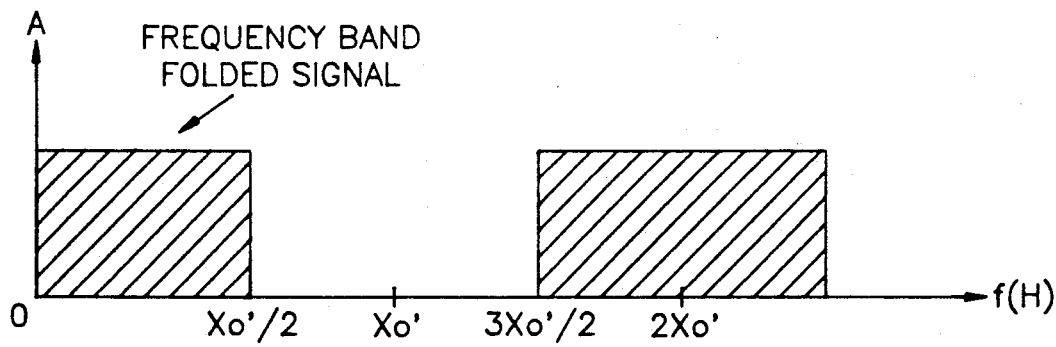
FIGS. 9a and 9b show a spectrum structure according to the conversion in proportion of two to one of the first and second sampling circuits 58, 59 of FIG. 2.
Figure 9B:
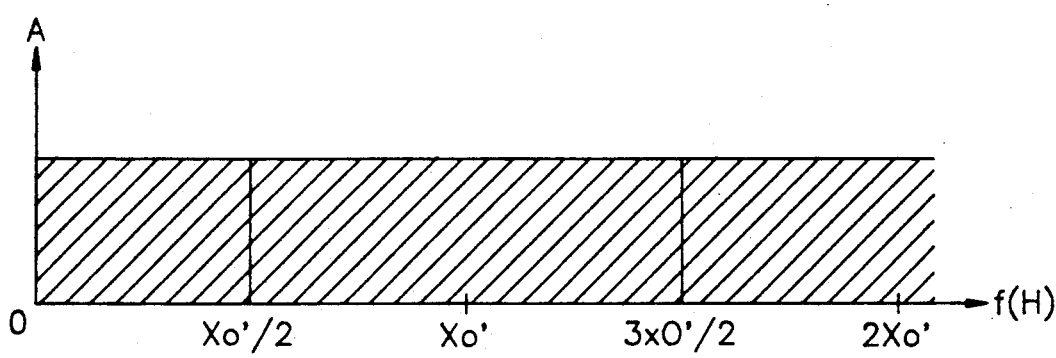

The spectrum structures according to the conversion in proportion of two to one of the first and second sampling circuits 58, 59 of FIG. 2, are shown in FIGS. 9A and 9B respectively representing before and after the sampling conversion.

The H-V filter characteristics are shown in FIG. 11A, and the spectrum folding of the field offset sub-sampling of the dynamic region signal processing path in FIG. 11B.

A preferred embodiment of the present invention will now be described with reference to FIGS. 1 to 13.

The output signals of a video camera are inputted as Y, R-Y, B-Y signals into the A/D converter 1. The signal band of Y is 22.5 MHz, and those of R-Y and B-Y 7.5 MHz. The digital signals from the A/D converter 1 are time-compressed to be rearranged as shown in FIG. 3 by the ITLC 2.

Figure 3:
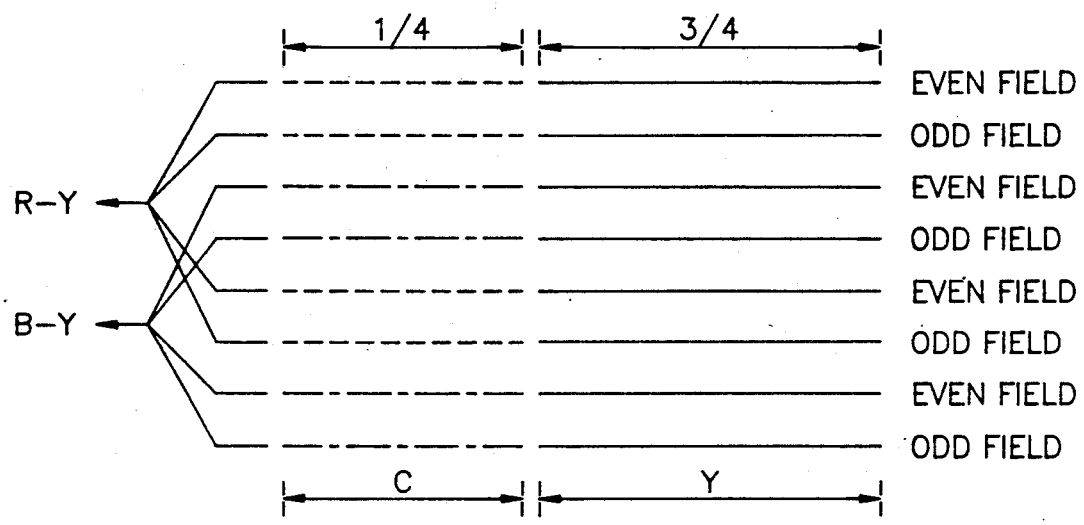
FIG. 3 shows a signal composition of the ITLC 2 of FIG. 1.

Referring to FIG. 3, the chrominance signal is compressed in proportion of four to one, and the luminance signal in proportion of four to three, whereby one quarter of the signal line is occupied by the chrominance signal, and the remaining three quarters by the luminance signal. In addition, the chrominance signals are comprised of alternately arranged R-Y and B-Y. In the present embodiment, the even field and odd field are combined to form a frame, in which the chrominance signals are arranged in the successive order of the even field R-Y, odd field R-Y, even field B-Y, and odd field B-Y.

The output signals of the ITLC 2 are separated into the low frequency band signal and the high frequency band signal by the band separation circuit 3. In this case, if the band of the input signal is Xo, the signals in the frequency band 0 to Xo/5 are outputted as the low frequency signal, and the signals in the frequency band of Xo/5 to Xo as the high frequency signal. Namely, in the case of the luminance signal, the signals in the frequency band of 0 to 4.5 MHz are outputted as the low frequency band signal, and the signals in the frequency band of 4.5 to 22.5 MHz as the high frequency band signal. Likewise, in the case of the chrominance signal, the signals in the frequency band of 0 to 1.5 MHz is outputted as the low frequency band signal, and the signals in the frequency band of 1.5 to 7.5 MHz as the high frequency band signal.

The low frequency band signal of the band separation circuit 3 is used for the motion vector detector 4 to detect the quantity of motion. Namely, the motion vector detector 4 produces a vector quantity corresponding to the amount of the panning or scrawling of the whole screen, as shown FIG. 5.

Figure 5:
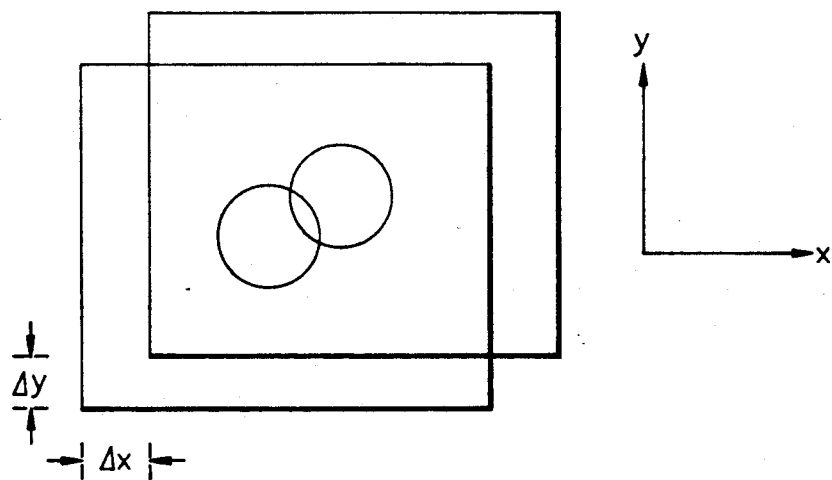
FIG. 5 is an example of motion vector in a screen.

Moving by $\Delta X$ in X-direction and by $\Delta Y$ in Y-direction, the signal has a vector value of $\Delta X$ and $\Delta Y$ as in FIG. 5. Of course, the vector value consists of binary numbers, wherein each direction has four bits and the horizontal value is 4MSB (Most Significant Bit). Namely, there is the vector value of $(X_S X_2 X_1 X_a Y_S Y_2 Y_1 Y_a)$ in which $X_S$, $Y_S$ are symbol bits.

The motion vector produced from the motion vector detector 4 and the low frequency band signal, via the delay circuit 6, are together delivered to the control and synchronizing adder 8 to synchronize the two signals.

The control and synchronizing adder 8 receives the motion vector and synchronizing information together with others. In this case the vertical synchronizing information is introduced in the beginning of the field, and the horizontal information in the beginning of each line. The motion vector information is introduced within vertical retrace line interval, not in active line. Assuming the active lines of 1080 in 1250 lines, there are produced vacant spaces of 170 lines per frame or 85 lines per field, wherein a suitable line is selected for introducing the motion vector information. Other information such as teletext, etc. may be transmitted through the vacant spaces.

The high frequency band signal of the band separation circuit 3 is delivered to the high frequency band signal processor 5, whose signal processing is illustrated in FIG. 2. The high frequency band signal is delivered to the frequency shifter 52 so as to shift it by the filtered low frequency as shown in FIG. 6. Namely, the high frequency band signal is moved by the frequency band of Xo/5 so as to change the frequency band of Xo/5−Xo to the frequency band of 0−4Xo/5. This shifted high frequency band signal is processed through two paths, one of which is dynamic region signal processing path, and the other static region signal processing path. Namely, by the two signal processing paths are the two information properly proportioned so that they are outputted according to the degree of the motion. The static and dynamic region signal processing paths are respectively through the H-V-T filter 54 and the H-V low-pass filter 53. The output of the frequency shifter 52 is applied to the H-V-T filter 54, whose characteristics are illustrated in FIG. 7. The H-V filter (horizontal and vertical filter) passes the region of $Y \leq Yo$ and $X \leq 4Xo/5$ as shown in FIG. 7A, and the H-T filter (horizontal and timing filter) passes the region of $$Z \leq \frac{Zo}{4} \text{ and } X \leq \frac{4}{5} Xo$$

as shown in FIG. 7B, wherein Yo is the number of the TV lines, Zo the frame frequency, and Xo the maximum band frequency of the video signal (i.e., Yo=1250 TV lines or 1080 active lines, Zo=7.5 Hz, Xo=22.5 MHz).

Figure 8:
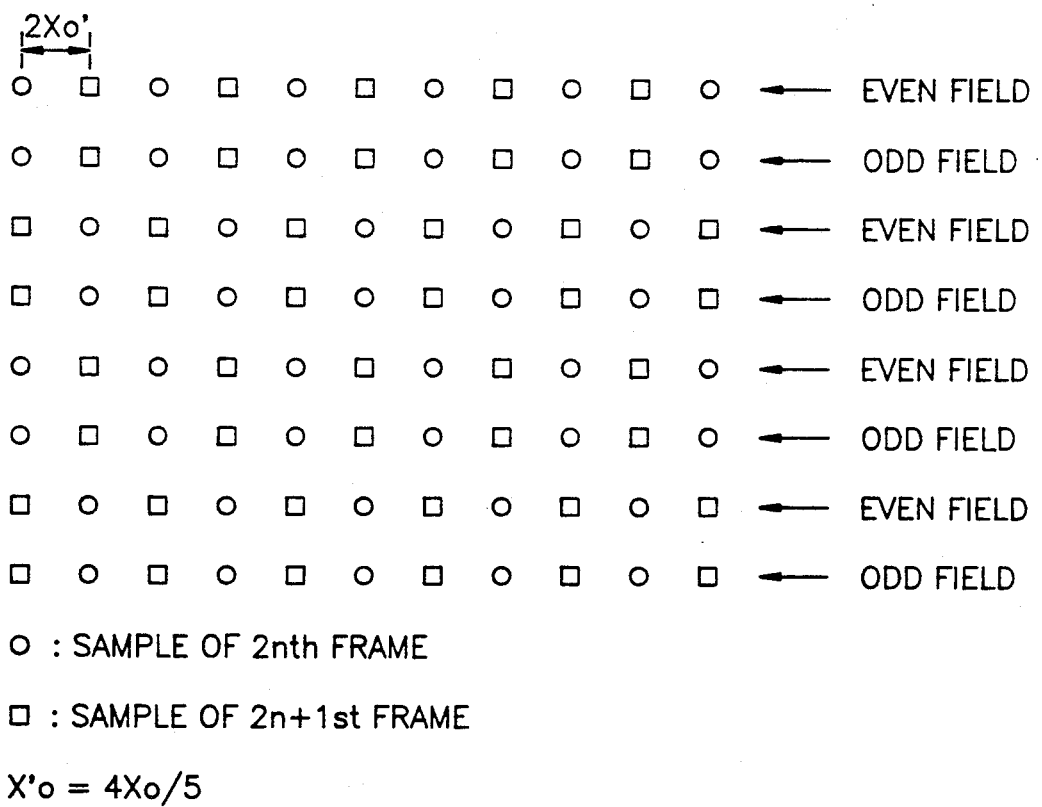
FIG. 8 shows the sampling structure of the frame offset sub-sampling circuit 56 of FIG. 2.

The output of the H-V-T filter 54 is sampled by the frame offset sub-sampling circuit 56 as shown in FIG. 8. The sampling frequency X'o is 4Xo/5, and the sampling frequency of the original signal 2X'o. Thus, there occurs the spectrum folding that is observed in the H-V direction but not in the T-V direction. The pass band of X'o/2 in the direction of the timing axis in FIG. 7B is to prevent the spectrum folding.

The output of the frame offset sub-sampling circuit 56 is applied to the low-pass filter 53. The horizontal LPF 57 has the pass band of X'o/2. The sampling frequency becomes again 2X'o after passing the low-pass filter 57. Referring to FIG. 9A showing the spectrum structure passing the low-pass filter 57, the frequency band of X'o/2−X'o is folded in the frequency band of 0−X'o/2.

The output of the low-pass filter 57 passes the second sampling circuit 59, thus the sampling frequency is changed from 2X'o to X'o. In the spectrum, the signal with the spectrum structure of FIG. 9A becomes the signal with the spectrum structure of FIG. 9B. Namely, the signal displayed around the frequency 2mX'o becomes the spectrum developed around mX'o, as shown in FIG. 9A (m is an integer).

The output of the second sampling circuit 59 is delivered to the T-filter 60 (timing direction filter) that is a pre-filter for preventing the aliasing during the sampling of the second field offset sub-sampling circuit 62. This filter only passes the signal of 0 to 15 Hz.

Figure 10:
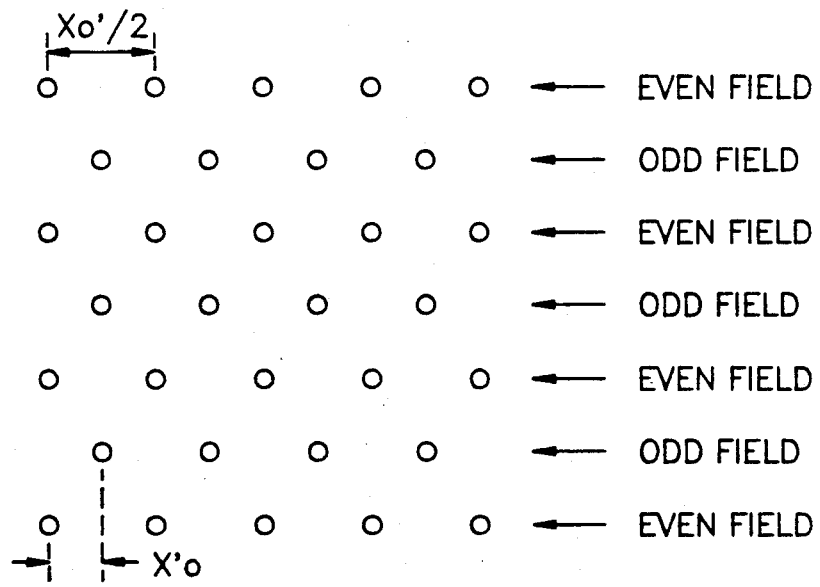
FIG. 10 shows a sampling structure of the first and second field offset sub-sampling circuits 61, 62 of FIG. 2.

The signal through T-filter 60 is sampled by the second field offset sub-sampling circuit 62 as shown FIG. 10, wherein the sampling frequency is X'o/2. Another spectrum folding occurs. Thus, in the frequency spectrum, the signal of X'o/4−X'o/2 is again folded over the signal of 0−X'o/4 of the folded signal of the frame offset sub-sampling in horizontal-vertical directions. In the H-T spectrum the signal is introduced into the spectrum between 15 Hz and 30 Hz in the T-direction. Namely, the spectrum folding is obtained without aliasing.

Summing up the spectrum folding process from the H-V-T filter 54 of the static region processing path to the second field offset sub-sampling circuit 62, the signal passing through the H-V-T filter 54 is folded in the frequency band of X'o/2−X'o with the range of 7.5 to 15 Hz in the direction of the timing axis by the frame offset sub-sampling circuit 56, while the signal through the T-filter 60 is folded in the frequency band of X'o/4−X'o/2 within the range of 15 to 30 HZ by the second offset sub-sampling circuit 62.

The output of the frequency shifter 52 is also applied to the H-V low-pass filter 53 of the dynamic region processing path. The H-V low-pass filter 53 only passes the frequency band of 0−X'o/2 of X'o band signal inputted into the horizontal low-pass filter with a frequency band of X'o/2, and the frequency band of 0−Yo/2 of Yo band signal inputted into the vertical low-pass filter with a frequency band of Yo/2. The above signal is delivered to the first sampling circuit 58. This signal is not folded.

The sampling frequency of the signal passing the first sampling circuit 58 is changed from 2X'o to X'o. The signal passing the first sampling circuit 58 is applied to the first field offset sub-sampling circuit 61, sampled in the sampling structure as shown in FIG. 10. In this case, the sampling frequency is X'o/2, and the frequency band of X'o/4−X'o/2 is spectrally folded over the frequency band of 0−X'o/4. The folded signal of the frequency band of X'o/4−X'o/2 is introduced vertically between Yo/2−Yo.

Figure 12:
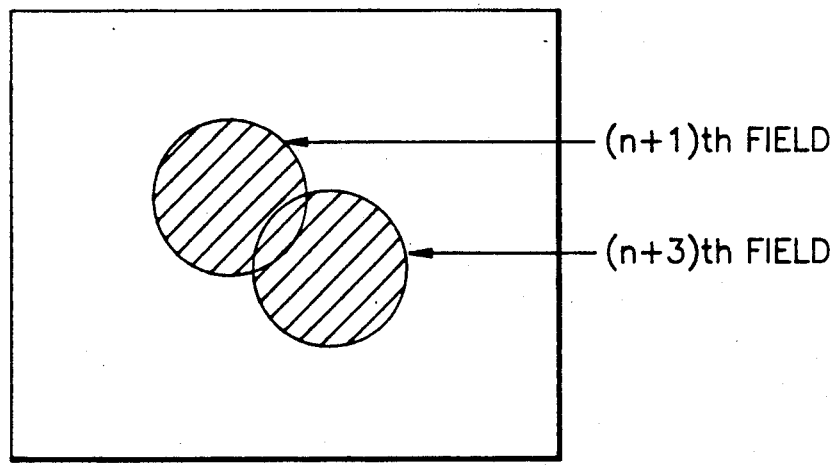
FIG. 12 shows motion region detection.

The characteristics of the H-V low-pass filter 53 is illustrated in FIG. 11A, and the spectrum folding of the first field offset sub-sampling circuit 61 in FIG. 11B. The output of the H-V low-pass filter 53 is delivered to the motion region detector 55 that detects the motion region by both the motion vector and the output of the H-V low-pass filter 53. The motion region detector 55 shifts the screen panned and scrawled by the motion vector to the amount of ΔX and ΔY, as shown in FIG. 5. This compensates for the panning and scrawling of the screen in order to capture each of the partial motions. Otherwise all the parts are represented as the dynamic region. Practically, in the case of panning and scrawling of the above transmission system, the signals are processed as the static region after detecting the motion vector. Referring to FIG. 12, the portion shaded by lines in the part where the motion occurs is detected as the motion region comparing (n+1)th field with (n+3)th field where the screen shift by the panning and scrawling is compensated by the motion vector. The output signals are divided into various levels according to the motional magnitude of the motion region. The output of the motion region detector 55 is inputted into the mixer 63 that mixes the outputs of the dynamic and static region processing paths according to the output signal of the motion region detector 55.

The output signal S of the mixer 63 depends on the output of the motion region detector 55 with the following Equation.

$$S = k\, S_m + (1-k)\, S_S$$

Wherein $S_m$ is the output signal of the first field offset sub-sampling circuit 61, $S_S$ the output signal of the second field offset sub-sampling circuit 62, and k the motional magnitude of the output of the motion region detector 55.

The output of the mixer 63 is inputted to the audio and synchronizing adder 7 of FIG. 1 that also receives audio signal and synchronizing information. The audio and synchronizing information to the audio and synchronizing adder 7 is as follows.

The vertical synchronizing information is introduced at the beginning of each field, and the horizontal synchronizing information at the beginning of each line. The audio information is introduced in the vertical retrace line interval, not the active line. Assuming the active lines of 1080 in 1250 lines, there are produced vacant spaces of 170 lines per frame or 85 lines per field, wherein a suitable line is selected for introducing the audio information.

Figure 13:
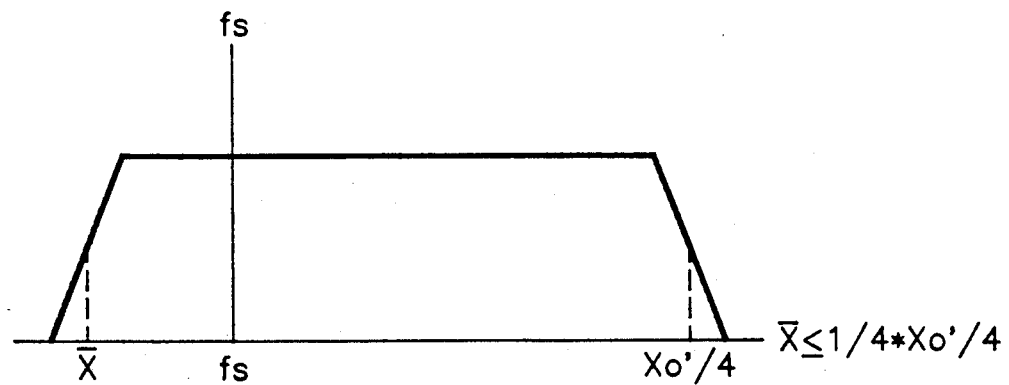
FIG. 13 illustrates a spectrum of a transmission signal.

The output of the audio and synchronizing adder 7 is applied, through the first D/A converter 10, to the first low-pass filter 12 with a frequency band of X'o/4 in reference to the horizontal axis. Likewise the output of the control and synchronizing adder 8 is applied through the second D/A converter 11 to the second low-pass filter 13 with a frequency band of X'o/4 in reference to the horizontal axis. The output signals of the first and second low-pass filters 12 and 13 are modulated respectively in quadra-phase and in-phase. Assuming the output of the second low-pass filter 13 is $V_L$, the output of the first low-pass filter $12 V_H$, and the intermediate modulated frequency $\omega_1 = 2\pi f_1$, the output of the adder A modulated in quadra-phase is as follows:

$$\text{Output of the adder} = \alpha V_L \sin\omega_1 t + \beta V_H \cos\omega_1 t$$

wherein $\alpha$ and $\beta$ represent respectively the gains of $V_L$ and $V_H$. The gain $\alpha$ is greater than the gain $\beta$. The output of the quadrature modulator 14 is transmitted through the transmission processor 15. The output signal is processed through the filter as shown in FIG. 13. This filter has the lower frequency band of $\overline{X}$ and the upper frequency band of X'o/4 with reference to the RF carrier frequency fs, wherein $\overline{X}$ is equal to or less than $(\frac{1}{4}).X'o/4$. The reason that the signal with the frequency band as shown in FIG. 13 is transmitted is to equalize the upper band and lower band so as to extract the in-phase and quadra-phase signals $V_H$ and $V_L$ from the received signal via the intermediate carrier signal. Otherwise there occurs a phase shift.

Then the signal passes the band-pass filter with the upper and lower frequency bands less than X in reference to fs, thus equalizing the upper and lower frequency bands. By the way if the Nyquist filter is used as in NTSC, the receiving end should also use inverting Nyquist filter.

As described above, the HDTV transmission system of the present invention employs both the sub-sampling technique and the band separation technique. The signal processing considerably varies with the sub-sampling and band separation for what signal, in what position and in what steps. For example, MUSE and HD-MAC employ the sub-sampling technique, and MIT, Zenith, etc. the sub-band coding technique or the band separation technique.

Thus the present invention provides an HDTV system, wherein the signals have the same frequency band as that of the conventional color TV signals and are transmitted through a vacant channel of the conventional color TV system. The HDTV system is compatible with the conventional color TV signal transmission system and employs frequency band separation technique together with sub-sampling technique.

What is claimed is:

1. A circuit for transmitting spectrum-compatible high-definition television signals in a television signal transmission system, said circuit comprising:
   analog-to-digital converter for converting analog luminance signal and chrominance signals into a digital signal;
   means for integration by compressing on a time-base said digital signal;
   band separation means for separating the output signal of said means for integration into a low frequency band signal and a high frequency band signal;
   motion vector detection means for detecting a motion vector signal from the low frequency band signal;
   high frequency processing means for processing the high frequency band signal of said band separation means in response to the motion vector signal;
   first synchronizing means for adding the low frequency signal to the motion vector signal;
   a first digital-to-analog converter for converting the output signal of said high frequency processing means to a first analog signal;
   a second digital-to-analog converter for converting the output signal of said first synchronizing means to a second analog signal; and
   quadrature modulation means for multiplying the first analog signal and the second analog signal by a first sinusoidal signal and a second sinusoidal signal, respectively, to provide a first multiplied signal and a second multiplied signal, and for synthesizing the first multiplied signal and second multiplied signal to provide a transmission signal.

2. A circuit for transmitting spectrum compatible high definition television signals as claimed in claim 1, the high frequency processing means comprising:
   shifting means for frequency shifting the high frequency band signals from said band separation means;
   first low-pass filter means for filtering the output signal of said shifting means horizontally and vertically;
   first filter means for filtering the output signal of said shifting means in the horizontal, vertical and timing directions;
   first sub-sampling means for sub-sampling the output signal of said first filter means in frame offset;
   second low-pass filter means for filtering the output signal of said first sub-sampling means in the direction of a horizontal axis;
   first sampling means for sampling the output signal of said second low-pass filter means at half the sampling rate of the second low-pass filter means;

second filter means for filtering the output signal of said first sampling means in the timing axis direction;

second sub-sampling means for sub-sampling the output signal of said second filter means in field offset;

motion region detection means for detecting motion regions in the output signal of said first low-pass filter means in response to the motion vector signal;

second sampling means for sampling the output signal of said first low-pass filter means at half the sampling rate of the first low-pass filter means;

third-sub-sampling means for sub-sampling the output signal of said second sampling means in field offset; and a mixer for mixing the output signal of said second sub-sampling means and the output signal of said third sub-sampling means in response to the output signal of said motion region detection means.

3. A method for transmitting spectrum-compatible high-definition television signals in a television signal transmission system, comprising:

separating digital luminance and chrominance signals into a low frequency band signal and a high frequency band signal;

detecting a motion vector from the low frequency band signal;

processing said high frequency band signal in response to the motion vector to create a processed high frequency band signal;

converting said low frequency band signal into a first analog signal through a first low-pass filtering, said low frequency band signal being delayed by a given time duration and added to said motion vector;

converting the processed high frequency band signal into a second analog signal through a second low-pass filtering; and multiplying the outputs of said the first analog signal and the second analog signal by a first sinusoidal signal and a second sinusoidal signal, respectively, and synthesizing the first analog signal and the second analog signal to produce a transmission signal.

4. A method for transmitting spectrum-compatible high-definition television signals as claimed in claim 3, wherein processing said high frequency band signal comprises:

shifting said high frequency band signal to produce a shifted high frequency band signal;

third low-pass filtering the shifted high frequency band signal in the direction of horizontal and vertical axes to produce a dynamic region signal;

fourth low-pass filtering the shifted high frequency band signal in the direction of horizontal, vertical and timing axes to produce a station region signal;

calculating a motion region signal from the dynamic region signal in response to said motion vector;

first sub-sampling and low-pass filtering the static region signal to produce a first sub-sampled signal;

sampling and filtering in the timing axis the first sub-sampled signal and then sub-sampling the first sub-sampled signal in field offset to produce an offset signal;

sampling and sub-sampling in field offset the dynamic region signal to produce a sampled dynamic region signal; and mixing the offset signal and the sampled dynamic region signal in response to the motion region signal.

5. A circuit for generating narrow bandwidth high-definition television signals, the circuit comprising:

band separation means for separating a digital signal into a low frequency signal and a high frequency signal;

motion vector calculation means for calculating a motion vector signal from the low frequency band signal;

high frequency signal processing means for generating a processed high frequency signal by processing the high frequency signal in response to the motion vector signal;

first adding means for adding the low frequency band signal to the motion vector signal and generating a low frequency/motion signal.

6. The circuit for generating narrow bandwidth high-definition television signals, according to claim 5, further comprising:

a first digital-to-analog converter for converting the processed high frequency signal to analog to generate a first analog signal; and a second digital-to-analog converter for converting the low frequency/motion signal to analog to generate a second analog signal.

7. The circuit for generating narrow bandwidth high-definition television signals, according to claim 6, further comprising quadrature modulation means for adding the first analog signal multiplied by a first sinusoidal signal and second analog signal multiplied by a second sinusoidal signal.

8. The circuit for generating narrow bandwidth high-definition television signals, according to claim 5, further comprising an analog-to-digital converter for converting an analog luminance signal and chrominance signals into the digital signal.

9. The circuit for generating narrow bandwidth high-definition television signals, according to claim 5, further comprising signal compression means for generating the digital signal by time compressing digital chrominance and luminance signals.

10. The circuit for generating narrow bandwidth high-definition television signals, according to claim 9, wherein the signal compression means time compresses the chrominance signals by 75% with the luminance signal by 25%, so that 25% of the digital signal is the chrominance signals and 75% is the luminance signal.

11. The circuit for generating narrow bandwidth high-definition television signals, according to claim 5, wherein the digital signal is comprised of alternately arranged R-Y and B-Y signals.

12. The circuit for generating narrow bandwidth high-definition television signals, according to claim 11, wherein the R-Y and B-Y signals are consecutively arranged: even field R-Y, odd field R-Y, even field B-Y, and odd field B-Y.

13. The circuit for generating narrow bandwidth high-definition television signals, according to claim 5, wherein the low frequency signal has a bandwidth of 0.2 X', were X' is the 3db drop-off point of the digital signal in the frequency domain.

14. The circuit for generating narrow bandwidth high-definition television signals, according to claim 5, wherein the motion vector signal is a vector quantity for panning of a television picture of the digital signal.

15. The circuit for generating narrow bandwidth high-definition television signals, according to claim 14, wherein the motion vector signal contains eight bits, four bits for each spatial axis of movement.

16. The circuit for generating narrow bandwidth high-definition television signals, according to claim 5, further comprising delaying and synchronizing means for synchronizing the motion vector signal received by the first adding means.

17. The circuit for generating narrow bandwidth high-definition television signals, according to claim 5, wherein the motion vector signal is introduced in vertical retrace line intervals.

18. The circuit for generating narrow bandwidth high-definition television signals, according to claim 5, further comprising:
audio encoding means for encoding an audio signal to provide an encoded audio signal; and
synchronizing means for adding the encoded audio signal and synchronizing information to the processed high frequency signal.

19. The circuit for generating narrow bandwidth high-definition television signals, according to claim 7, further comprising a first analog low-pass filter and a second analog low-pass filter for low pass filtering the first analog signal and the second analog signal, respectively, before the first analog signal and the second analog signal are received by the quadrature modulation means.

20. The circuit for generating narrow bandwidth high-definition television signals, according to claim 5, the high frequency processing means comprising:
first low-pass filter means for generating a dynamic region signal by filtering the high frequency signal horizontally and vertically;
first filter means for generating a static region signal by filtering the high frequency signal horizontally, vertically, and temporally;
first sub-sampling means for generating a sub-sampled static region signal by sub-sampling the static region signal in frame offset;
second low-pass filter means for generating a filtered static region signal by filtering the sub-sampled static region signal;
first sampling means for generating sampled/filtered signal by sampling filtered static region signal;
second filter means generating a filtered/sampled signal by filtering the sampled/filtered signal temporally;
second sub-sampling means for generating a sub-sampled signal by sub-sampling the filtered/sampled signal;
motion region detection means for generating a motion region signal by detecting motion regions in the dynamic region signal in response to the motion vector signal;
second sampling means for generating a second sampled signal by sampling the dynamic region signal;
third-sub-sampling means for generating a third sub-sampled signal by su-sampling the second sampled signal in field offset; and
a mixer for mixing the sub-sampled signal with the third sub-sampled signal in response to the motion region signal.

21. The circuit for generating narrow bandwidth high-definition television signals, according to claim 20, wherein the first low-pass filter means low-pass filters, vertically $Y \leq$ and horizontally $X \leq$, where $X'$ is the 3 db drop-off point of the digital signal in the frequency domain.

22. The circuit for generating narrow bandwidth high-definition television signals, according to claim 20, wherein the first filter low-pass filters: temporally $Z \leq 0.25 \ Z'$ and horizontally $X \leq$, where $X'$ is a 3 db drop-off point of the digital signal in the frequency domain.

23. The circuit for generating narrow bandwidth high-definition television signals, according to claim 20, the high frequency processing means further comprising frequency shifting means for shifting the high frequency signal received by the first low-pass filter and the first filter means.

24. The circuit for generating narrow bandwidth high-definition television signals, according to claim 23, wherein the high frequency signal shifted down by 0.2 $X'$, were $X'$ is a 3 db drop-off point of the digital signal in the frequency domain.

25. The circuit for transmitting spectrum-compatible high-definition television signals, according to claim 20, wherein a sampling rate of the first sub-sampling means is half the rate of the first filter means.

26. The circuit for transmitting spectrum-compatible high-definition television signals, according to claim 25, wherein a sampling rate of the first filter is at least twice the bandwidth of the high frequency signal.

27. The circuit for generating narrow bandwidth high-definition television signals, according to claim 24, wherein the second low-pass filter has a passband of half the bandwidth of the high frequency signal.

28. The circuit for generating narrow bandwidth high-definition television signals, according to claim 24, wherein the second low-pass filter has a sampling frequency twice that of the first sub-sampling means.

29. The circuit for generating narrow bandwidth high-definition television signals, according to claim 24, wherein the first sampling means has a sampling frequency half that of the second low-pass filter.

30. The circuit for generating narrow bandwidth high-definition television signals, according to claim 20, wherein the second filter is a pre-filter for preventing aliasing at the second sub-sampling means.

31. The circuit for generating narrow bandwidth high-definition television signals, according to claim 24, wherein the sampling rate of the a second sub-sampling means is half that of the second filter means.

32. The circuit for generating narrow bandwidth high-definition television signals, according to claim 24, wherein the first low-pass filter has a passband of half the bandwidth of the high frequency signal.

33. The circuit for generating narrow bandwidth high-definition television signals, according to claim 24, wherein the first sampling means samples the dynamic region signal at half the rate of the second low-pass filter means.

34. The circuit for generating narrow bandwidth high-definition television signals, according to claim 20, wherein the first sampling means samples at one half the rate of the first low-pass filter means.

35. The circuit for generating narrow bandwidth high-definition television signals, according to claim 24, wherein the third sub-sampling means samples at half the rate of the second sampling means.

36. The circuit for generating narrow bandwidth high-definition television signals, according to claim 20, wherein the third sub-sampling means samples at one quarter the frequency of first low-pass filter.

37. The circuit for generating narrow bandwidth high-definition television signals, according to claim 20, wherein the motion region signal indicates the magnitude and direction a picture should be shifted.

38. The circuit for generating narrow bandwidth high-definition television signals, according to claim 20, wherein the mixer output is k S'+(1−k)S", were k is the motion region signal, S' third sub-sampled signal, and S" is the sub-sampled signal.

39. The circuit for generating narrow bandwidth high-definition television signals, according to claim 18, wherein the synchronizing information comprises vertical synchronizing information and horizontal synchronizing information introduced at the beginning of each field and each line, respectively.

40. The circuit for generating narrow bandwidth high-definition television signals, according to claim 5, wherein the high frequency processing means comprises:
   static region processing means for processing the high frequency signal to generate a static region signal; and
   dynamic region processing means for processing the high frequency signal to generate a dynamic region signal.

41. The circuit for generating narrow bandwidth high-definition television signals, according to claim 40, wherein the high frequency processing means further comprises motion region detecting and mixing means for mixing the dynamic region signal and the active region signal in response to detected motion regions in the high frequency signal to generate the processed high frequency signal.

42. The circuit for generating narrow bandwidth high-definition television signals, according to claim 41, wherein the static region processing means is further comprised of horizontally, vertically, and temporally filtering the high frequency signal.

43. The circuit for generating narrow bandwidth high-definition television signals, according to claim 41, wherein the dynamic region processing means is further comprised of horizontally and vertically filtering the high frequency signal.

44. The circuit for generating narrow bandwidth high-definition television signals, according to claim 41, wherein the static region processing means is further comprised of horizontally, vertically, and temporally filtering the high frequency signal and generating the static region signal having a sampling rate a quarter that of the high frequency signal; and wherein the dynamic region processing means is further comprised of horizontally and vertically filtering the high frequency signal and generating the dynamic region signal having a sampling rate a quarter that of the high frequency signal.

* * * * *

UNITED STATES PATENT AND TRADEMARK OFFICE
CERTIFICATE OF CORRECTION

Page 1 of 5

PATENT NO. : 5,184,219
DATED : Feb. 2, 1993
INVENTOR(S) : Hyun-Deok Cho

It is certified that error appears in the above-indentified patent and that said Letters Patent is hereby corrected as shown below:

IN THE ABSTRACT

Line 1,  before "HDTV", change "An" to --a--;

Line 4,  before "unoccupied", change "a" to --an--; and

Line 6,  before "ITLC", change "a" to --an--:

| | | |
|---|---|---|
| Column 1, | Line 11, | before "transmission', change "signals" to --signal--; |
| | Line 22, | between "to" and "solve", insert --be--; |
| | Line 24, | before "MUSE", change "japanese" to --Japanese--; |
| | Line 31, | after "provide", change "an" to --a--; |
| | Line 34, | before "unoccupied", change "a" to --an--; |

UNITED STATES PATENT AND TRADEMARK OFFICE
CERTIFICATE OF CORRECTION

PATENT NO. : 5,184,219
DATED : Feb. 2, 1993
INVENTOR(S) : Hyun-Deok Cho

It is certified that error appears in the above-indentified patent and that said Letters Patent is hereby corrected as shown below:

| | | |
|---|---|---|
| Column 1, | Line 37, | before "HDTV", change "an" to --a--; |
| | Line 42, | after "compatible", change "high-definition TV" to --HDTV--; |
| | Line 44, | before "an", change "comprising" to --including--; |
| | Line 49, | before "from", change "outputted" to --output--; |
| | Line 62, | after "signals", change "inputted" to --input--; |
| Column 2, | Line 55, | after "data", change "outputted" to --output--; |
| Column 3, | Line 2, | after "signals", change "inputted" to --input--; |
| | Line 21, | after "52,", change "an" to --a--; |
| | Line 22, | after "53,", change "an" to --a--; |

UNITED STATES PATENT AND TRADEMARK OFFICE
CERTIFICATE OF CORRECTION

PATENT NO. : 5,184,219
DATED : Feb. 2, 1993
INVENTOR(S) : Hyun-Deok Cho

It is certified that error appears in the above-indentified patent and that said Letters Patent is hereby corrected as shown below:

|  |  |  |
|---|---|---|
|  | Line 31, | before "H-V", change "An" to --A--; |
|  | Line 34, | before "H-V-T", change "An" to --A--; |
|  | Line 44, | after "60", change "is to filters" to --filters--; |
| Column 4, | Line 14, | after "are", change "inputted" to --input--; |
|  | Line 25-26, | before "alternately", delete "are comprised of" and insert --include--; |
|  | Line 40, | after "are", change "outputted" to --output--; |
|  | Line 44-45, | after "MHZ", change "is outputted" to --are output--; |

UNITED STATES PATENT AND TRADEMARK OFFICE
CERTIFICATE OF CORRECTION

PATENT NO. : 5,184,219
DATED : Feb. 2, 1993
INVENTOR(S) : Hyun-Deok Cho

It is certified that error appears in the above-indentified patent and that said Letters Patent is hereby corrected as shown below:

| | | |
|---|---|---|
| Column 5, | Line 24, | before "according", change "outputted" to --output--; |
| Column 6, | Line 29, | before "into", change "inputted" to --input--; |
| | Line 31, | before "into", change "inputted" to --input--; |
| | Line 45, | after "53", change "is" to --are--; |
| | Line 67, | before "into", change "inputted" to --input--; and |
| Column 7, | Line 5, | after "following", change "Equation" to --equation--: |

IN THE CLAIM

| | | |
|---|---|---|
| Claim 3, | Line 39, | after "said", delete "the" (the second occurrence); |
| Claim 20, | Line 60, | after "by", change "su-sampling" to --sub-sampling--; |
| Claim 21, | Line 68, | after "$Y \leq$", insert --(number of lines)-- and |
| | | after "$X \leq$", insert --(0.8 X')--; |

UNITED STATES PATENT AND TRADEMARK OFFICE
CERTIFICATE OF CORRECTION

PATENT NO.   : 5,184,219
DATED        : Feb. 2, 1993
INVENTOR(S)  : Hyun-Deok Cho It is certified that error appears in the above-indentified patent and that said Letters Patent is hereby corrected as shown below:

Claim 22, Line 6, after "Z'", insert --,where Z' is a frame frequency,-- and after "$X \leq$", insert --(0.8 X')--; and Claim 24, Line 18, after "X'," (the first occurrence), change "were" to --where--:

Signed and Sealed this

Fifteenth Day of July, 1997

*Attest:*

*Attesting Officer*

BRUCE LEHMAN
*Commissioner of Patents and Trademarks*